(12) United States Patent
Tatarian

(10) Patent No.: US 11,143,352 B1
(45) Date of Patent: Oct. 12, 2021

(54) VACUUM INSULATION MODULE AND ASSEMBLY

(71) Applicant: Matthew M. Tatarian, Franklin, MI (US)

(72) Inventor: Matthew M. Tatarian, Franklin, MI (US)

( * ) Notice: Subject to any disclaimer, the term of this patent is extended or adjusted under 35 U.S.C. 154(b) by 0 days.

(21) Appl. No.: 17/001,725

(22) Filed: Aug. 25, 2020

(51) Int. Cl.
*F16L 59/065* (2006.01)
*E04B 1/80* (2006.01)
*E06B 3/663* (2006.01)

(52) U.S. Cl.
CPC ............ *F16L 59/065* (2013.01); *E04B 1/803* (2013.01); *E06B 3/66304* (2013.01); *Y10T 428/231* (2015.01)

(58) Field of Classification Search
CPC .... Y10T 428/231; E04B 1/803; F16L 59/065; F22D 2201/14; Y02B 80/12
See application file for complete search history.

(56) References Cited

U.S. PATENT DOCUMENTS

| 5,270,092 | A | 12/1993 | Griffith et al. |
| 7,562,507 | B2 | 7/2009 | Fleming |
| 7,968,159 | B2 | 6/2011 | Feinerman |
| 8,475,893 | B2 | 7/2013 | Feinerman |
| 9,174,791 | B2 | 11/2015 | Hyde et al. |

FOREIGN PATENT DOCUMENTS

SU        727775 A1 * 4/1980

OTHER PUBLICATIONS

Machine translation of SU727775A1 (Year: 2020).*

* cited by examiner

*Primary Examiner* — Alexander S Thomas
(74) *Attorney, Agent, or Firm* — Peter J. Rashid

(57) ABSTRACT

A vacuum insulation assembly includes a number of vacuum insulation modules. Each module includes a first layer of material, a second layer of material substantially parallel to the first layer of material, a frame member disposed between the perimeter edges of the first and second layer of materials, a vacuum chamber formed between the first and second layer of materials and the frame member, and one or more spacers that generate a magnetic field. The spacers can be located on the interior, the exterior or disposed within the first and second layers of material. In one aspect, the spacers are permanent magnets, electromagnets, and the like, that are positioned such that the spacers provide a sufficient magnetic field to prevent the first and second layers of material from contacting each other.

20 Claims, 2 Drawing Sheets

VACUUM INSULATION MODULE AND ASSEMBLY

FIELD OF THE DISCLOSURE

The invention pertains to the field of thermal insulation panels for use in building walls, refrigerators and the like, and in particular, to a vacuum insulation panel and assembly having spacers for maintaining physical separation between two layers of material under partial or total vacuum.

BACKGROUND OF THE DISCLOSURE

Means by which walls and the like may be insulated are much discussed in the literature, and various ways of minimizing conductive, convective and radiative heat transfer are described. Fundamentally, all approaches use certain basic understandings of heat transfer. These understandings are applied to select and combine materials in a way which provides the highest possible insulating value under a given set of conditions. There is always a trade-off, however, with respect to the cost of the materials used, and the effort necessary to manufacture such materials into a truly effective insulator from both an insulating and cost of manufacture standpoint.

As the cost of energy increases, even relatively small quantitative improvements in the total performance of a particular insulating scheme can provide significant savings for the energy consumer. Given the same insulating value, the relative value of an improved insulating scheme must take into account the thickness of the material, the cost of the materials used, the cost to assemble those materials in the proper form, the cost of transporting such insulation to the place of installation, and the cost to install. Generally, insulations with good thermal performance per unit thickness are more desirable. Bulky and or heavy insulation schemes are disadvantageous, even if good insulating value is provided. Also disadvantageous are materials which have negative environmental impacts, such as chlorofluorocarbon (CFC) blown foams, and potential health hazards, such as airborne fiberglass.

Insulation performance is often measured by use of "R" values, where R is a thermal resistivity, and higher R-values indicate better insulating performance. R-value/in is used to compare the thermal performance of different insulating materials. For example, fiberglass has an R-value/in of about 3.2 hr-ft$^2$-F/BTU, while styrene foam has an R-value/in of about 5.0 hr-ft$^2$-F/BTU. Chlorofluorocarbon (CFC) blown polyurethane foam has an initial R-value/in of about 7.2 hr-ft$^2$-F/BTU, which slowly degrades as CFCs diffuse out of the foam cells.

The primary function of a thermal insulation is to reduce heat transfer. There are three forms of heat transfer; conduction, convection, and radiation. Conduction involves flow of heat or cold through the material in the form of direct interaction of atoms and molecules. Convection involves conduction combined with mass transfer of fluids (gases) where flow of heat or cold is enhanced by the relative movement of fluids at different temperatures. Radiation involves direct net energy transfer between surfaces (at different temperatures) in the form of long wave infrared electro-magnetic radiation (light) as surfaces emit and absorb this radiation. The amount of absorption and emission of radiation depends on the surface emissivity which is a material property. Low emissivity surfaces emit and absorb much less radiation than high emissivity surfaces.

Insulations attempt to reduce these three components in different ways. For example, fiberglass insulation utilizes fairly low conductivity fibers in a stack or batt with air amongst the fibers. The fibers are oriented, somewhat randomly, such that they do not line up in the direction across the batt, thereby reducing solid conduction. Convective movement of the air amongst the fibers is reduced by the presence of large numbers of fibers. Radiation is somewhat scattered as it passes through the fibers which reduces radiative heat transfer. Closed cell foam structures, however, are comprised of a polymer matrix with many small, mostly closed cavities. Conduction is reduced by using low conductivity materials and comprising most of the volume with air (or remains of the blowing agent). Convection is effectively eliminated by trapping the gases in small closed cells. Radiation is low because the cells are typically very small and there is little temperature difference between cavity walls and hence low driving force for radiative heat transfer.

In another example, some conventional insulations may utilize gas for most of the volume because gases are much lower conductivity than solids or liquids. The ideal limiting case for gaseous insulations is when convection and radiation are completely suppressed, and the only form of heat transfer is through the gas.

Conduction can only be eliminated by removing all the mass, as in a vacuum, also known as a full or total vacuum. That is, the insulation assembly would have an infinite R-value/in for conduction. In addition, a full or total vacuum eliminates the travel of sound through the insulation assembly.

While a vacuum is known to be the best of all insulators against conductive heat transfer and sound transmission, it must be maintained in a stable structure in order to be practical. This is particularly true in the case of a structure that is under a partial or total vacuum. Thus, it is desirable to provide a vacuum insulation module and assembly capable of maintaining structural integrity under a partial or total vacuum, thereby minimizing or eliminating conductive heat transfer and sound transmission through the vacuum insulation assembly.

SUMMARY OF THE DISCLOSURE

The problem of providing a vacuum insulation assembly capable of maintaining structural integrity under a partial or total vacuum is solved by providing a spacer associated with each layer of material that generates a magnetic field to prevent physical contact between the layers of material of a vacuum insulation module and assembly.

In one aspect, a vacuum insulation module comprises a first layer of material having a perimeter edge; a second layer of material having a perimeter edge, the second layer of material spaced apart from the first layer of material; a frame member disposed between the perimeter edges of the first and second layer of materials; and a vacuum chamber formed between the first and second layer of materials and the frame member. A first spacer is associated with the first layer of material and a second spacer is associated with the second layer of material. The first and second spacers generate a sufficient magnetic field to prevent physical contact between the first layer of material and the second layer of material.

In another aspect, a vacuum insulation assembly comprises a plurality of vacuum insulation modules adjacent each other. Each panel module comprises a first layer of material having a perimeter edge; a second layer of material having a perimeter edge, the second layer of material spaced apart from the first layer of material; a frame member disposed between the perimeter edges of the first and second layer of materials; and a vacuum chamber formed between the first and second layer of materials and the frame member; and a pair of spacers. A first spacer is associated with the first layer of material and a second spacer is associated with the second layer of material. The first and second spacers generate a sufficient magnetic field to prevent physical contact between the first layer of material and the second layer of material.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION

Figure 1:
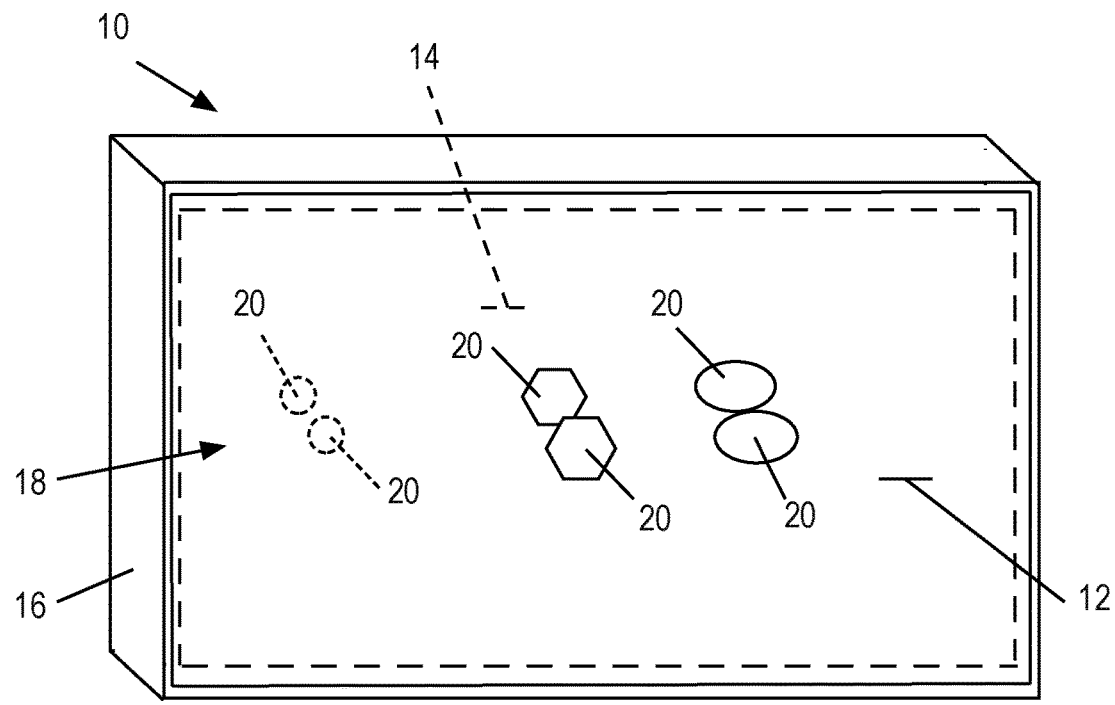
FIG. 1 is an isometric view of a vacuum insulation module in accordance with an embodiment of the invention.
Figure 2:
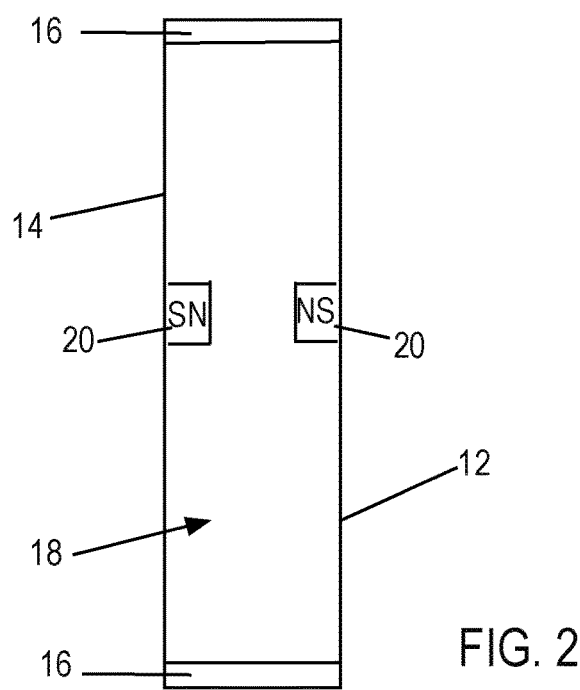
FIG. 2 is a side elevation view, in section, of the vacuum insulation module of FIG. 1.

Referring now to FIGS. 1 and 2, a vacuum insulation module 10 is generally shown according to an embodiment of the invention. In general, the insulation module 10 comprises a first layer of material 12, a second layer of material 14 spaced apart from the first layer of material 12, and a frame member 16 disposed between the first and second layers of material 12, 14. In the illustrated embodiment, the first layer of material 12 is generally parallel to the second layer of material 14. However, it will be appreciated that the first layer of material 12 can be concentric with the second layer of material 14. A vacuum chamber 18 is formed by the empty space between the first and second layers of material 12, 14 and the frame member 16. In FIG. 1, the broken lines indicate the inner edges of the frame member 16, which is partly covered by the first layer of material 12. It will be appreciated that the frame member 16 seals the perimeter edges of the first and second layers of material 12, 14 in an airtight manner.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by embodiments. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, a magnet is a material or object that produced a magnetic field. This magnetic field is invisible but is responsible for the most notable property of a magnet: a force that pulls on other ferromagnetic materials, such as iron, and attracts or repels other magnets.

As used herein, a permanent magnet is an object made from a material that is magnetized and creates its own persistent magnetic field. An everyday example is a refrigerator magnet used to hold notes on a refrigerator door. Materials that can be magnetized, which are also the ones that are strongly attracted to a magnet, are called ferromagnetic (or ferrimagnetic). These include the elements iron, nickel and cobalt and their alloys, some alloys of rare-earth metals, and some naturally occurring minerals such as lodestone. Although ferromagnetic (and ferrimagnetic) materials are the only ones attracted to a magnet strongly enough to be commonly considered magnetic, all other substances respond weakly to a magnetic field, by one of several other types of magnetism.

Ferromagnetic materials can be divided into magnetically "soft" materials like annealed iron, which can be magnetized but do not tend to stay magnetized, and magnetically "hard" materials, which do. Permanent magnets are made from "hard" ferromagnetic materials, such as alnico and ferrite, that are subjected to special processing in a strong magnetic field during manufacture to align their internal microcrystalline structure, making them very hard to demagnetize. To demagnetize a saturated magnet, a certain magnetic field must be applied, and this threshold depends on coercivity of the respective material. "Hard" materials have high coercivity, whereas "soft" materials have low coercivity. The overall strength of a magnet is measured by its magnetic moment or, alternatively, the total magnetic flux it produces. The local strength of magnetism in a material is measured by its magnetization.

As used herein, an electromagnet is made from a coil of wire that acts as a magnet when electric current passes through it, but stops being a magnet when the current stops. Often, the coil is wrapped around a core of "soft" ferromagnetic material such as mild steel, which greatly enhances the magnetic field produced by the coil.

As used herein, a magnetic field is a vector field (more precisely a pseudovector field) that describes the magnetic influence of electric charges in relative motion and magnetized materials. A charge that is moving parallel to a current of other charges experiences a force perpendicular to its own velocity. The effects of magnetic fields are commonly seen in permanent magnets, which pull on magnetic materials (such as iron) and attract or repel other magnets. Magnetic fields surround and are created by magnetized material and by moving electric charges (currents) such as those used in electromagnets. They exert forces on nearby moving electrical charges and torques on nearby magnets. In addition, a magnetic field that varies with location exerts a force on magnetic materials. Both the strength and direction of a magnetic field vary with location. As such, it is described mathematically as a vector field.

As mentioned above, magnets exert forces and torques on each other due to the rules of electromagnetism. The forces of attraction field of magnets are due to microscopic currents of electrically charged electrons orbiting nuclei and the intrinsic magnetism of fundamental particles (such as electrons) that make up the material. Both of these are modeled quite well as tiny loops of current called magnetic dipoles that produce their own magnetic field and are affected by external magnetic fields. The most elementary force between magnets, therefore, is the magnetic dipole-dipole interaction, also called dipolar coupling. If all of the magnetic dipoles that make up two magnets are known, then the net force on both magnets can be determined by summing up all these interactions between the dipoles of the first magnet and that of the second magnet.

As used herein, a panel, a panel member or panel assembly can be referred to by their locations on a building, such as wall panels, roof panels, window panels, and the like.

Referring to FIGS. 1 and 2, the first layer of material 12 and the second layer of material 14 can be made of any suitable rigid, gas impermeable material capable of being placed under a partial or total vacuum. For example, the first and second layers of material 12, 14 can be made of glass, plastic, metal, PVC, corrugated material, and the like.

The frame member 16 can be made of any suitable sealing material capable of sealing, while maintaining the spacing between the first and second layer of materials 12, 14 under a partial or total vacuum. For example, the frame member 16 can be made of metal, plastic, elastomeric material, such as rubber, and the like. As shown in FIG. 2, the first and second layer of materials 12, 14 overlap the frame member 16 to form the vacuum chamber 18 therebetween.

In one aspect, the vacuum insulation module 10 further comprises a plurality of spacers 20 associated with the first and second layers of material 12, 14, wherein each spacer 20 generates a magnetic field. The purpose of the spacers 20 is to provide a sufficient magnetic field to prevent the first and second layers of material 12, 14 from coming into contact with each other when a partial or total vacuum is provided in the vacuum chamber 18, thereby maintaining the heat transfer properties or characteristics of the vacuum insulation module 10.

As shown in FIG. 1, a first spacer 20 is mounted on the first layer of material 12 and disposed within the vacuum cavity 18 (shown in phantom in FIG. 1). In another embodiment, the first spacer 20 can be mounted on the exterior of the first layer of material 12 and disposed outside the vacuum cavity 18 (shown as oval-shaped in FIG. 1). In yet another embodiment, the first spacer 20 can be disposed within the first layer of material 12 (shown as hexagonal shaped in FIG. 1).

Similarly, a second spacer 20 is mounted on the second layer of material 12 and disposed within the vacuum cavity 18 (shown in phantom in FIG. 1). In another embodiment, the second spacer 20 can be mounted on the exterior of the second layer of material 12 and disposed outside the vacuum cavity 18 (shown as oval-shaped in FIG. 1). In yet another embodiment, the second spacer 20 can be disposed within the second layer of material 12 (shown as hexagonal shaped in FIG. 1). The first spacer 20 can be identical in size and shape to the second spacer 20. Alternatively, the first spacer 20 can be different in size and shape than the second spacer 20, so long as the first and second spacers 20 generate a magnetic field.

In the illustrated embodiment, each spacer 20 comprises a magnet, such as a permanent magnet, and the like. Ideally, the permanent magnets 20 are positioned such that one pole, such as the north pole, of the permanent magnet 20 mounted on or disposed within the first layer of material 12 faces the same pole (i.e., the north pole) of the permanent magnet 20 mounted on or disposed within the second layer of material 12. It should be appreciated that the south poles, rather than the north poles, of the permanent magnets 20 can be facing each other, so long as the same pole on both permanent magnets 20 are facing each other. As a result, the permanent magnets 20 provide a sufficient magnetic field to repel each other and prevent the first layer of material 12 from coming into contact with the second layer of material 14 when the vacuum insulation module 10 is under a partial or total vacuum, thereby maintaining the heat transfer properties or characteristics of the vacuum insulation module 10.

The spacers 20 can be mounted to or disposed within the first and second layers of material 12, 14 using any means known in the art, such as bonding, gluing, and the like. In addition, the first and second layers of material 12, 14 may include more than one spacer 20, as shown in FIG. 1.

Figure 3:
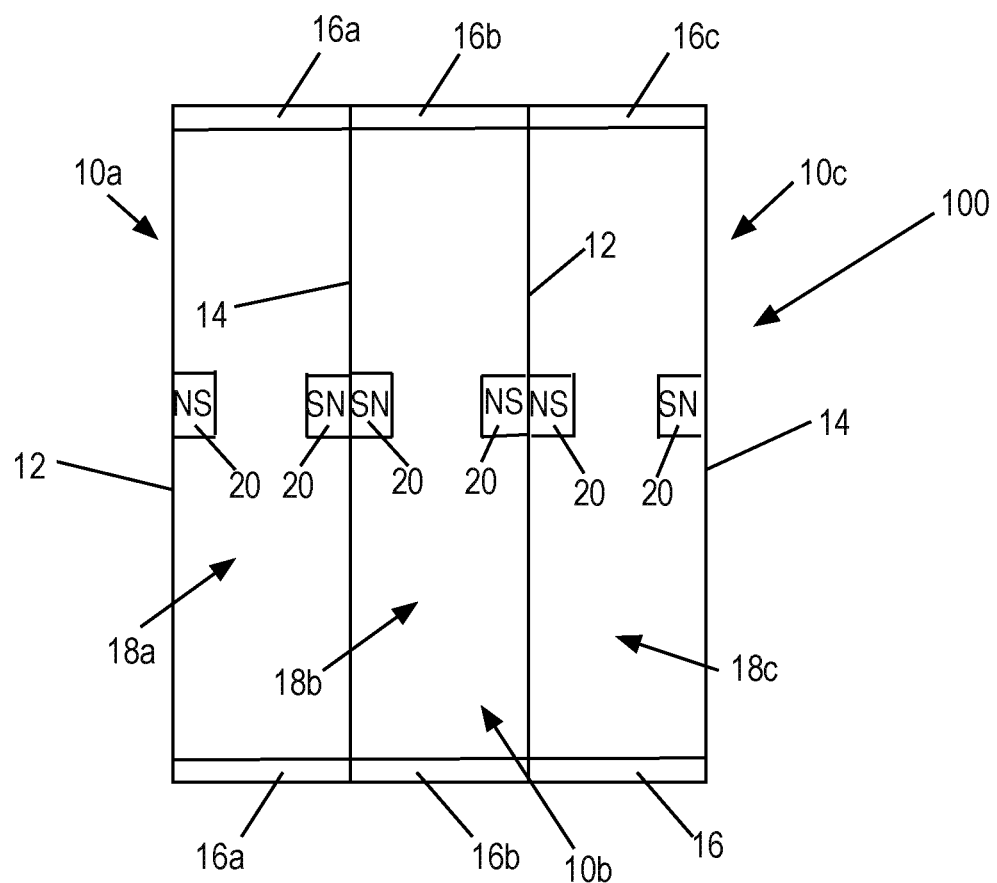
FIG. 3 is a side elevation view, in section, of a vacuum insulation assembly in accordance with an embodiment of the invention.

Referring now to FIG. 3, a vacuum insulation assembly 100 is shown according to an embodiment of the invention. The vacuum insulation panel assembly 100 comprises a plurality of vacuum insulation modules 10a-c arranged adjacent to each other in a stacking relationship. In the illustrated embodiment, there are a total of three vacuum insulation modules 10a-c arranged adjacent to each other.

Specifically, the vacuum insulation assembly 100 comprises a first vacuum insulation module (10a), a second vacuum insulation module (10b), and a third vacuum insulation module (10c), wherein the second vacuum insulation module (10b) is disposed between the first and third vacuum insulation modules (10a, 10c). However, it should be appreciated that the invention can be practiced with any desirable number of vacuum insulation modules 10 arranged adjacent to each other.

As shown in FIG. 3, the vacuum insulation assembly 100 has internal layers of material 12, 14 that can be shared between adjacent vacuum insulation modules 10, and external layers of material 12, 14 that are exposed to the environment. In the illustrated embodiment, the spacers 20 comprises permanent magnets in which the north pole of the magnets 20 in the center vacuum insulation module 10b face each other, while the south pole of the magnets 20 in the outer vacuum insulation modules 10a, 10c face each other. As a result, the north pole of the magnet 20 of the outer vacuum insulation module 10a is adjacent to the south pole (i.e., opposite pole) of the magnet 20 of the center vacuum insulation module 10b, thereby causing an attractive force between the vacuum insulation modules 10a, 10b. This attractive force may be sufficient to attach the vacuum insulation modules 10a, 10b to each other.

Likewise, the north pole of the magnet 20 of the outer vacuum insulation module 10c is adjacent to the south pole (i.e., opposite pole) of the magnet 20 of the center vacuum insulation module 10b, thereby causing an attractive force between the vacuum insulation modules 10b, 10c. This attractive force may be sufficient to cause the vacuum insulation modules 10b, 10c to be attached to each other. Thus, the vacuum insulation assembly 100 can be held together by the attractive forces exerted by the magnets 20 of their respective vacuum insulation module 10a-c.

It should be noted that it is possible that the first and second layers of material 12, 14 separating the vacuum insulation modules 10a-c in the interior of the panel assembly 100 can be shared such that only one layer of material 12 separates adjacent vacuum insulation modules 10a-c in the interior of the vacuum insulation assembly 100 to decrease cost, as shown in FIG. 3. Alternatively, both the first and second layers of material 12, 14 can be used to separate the vacuum insulation modules 10a, 10c in the interior of the vacuum insulation assembly 100.

In the vacuum insulation assembly 100, the vacuum insulation modules 10a-c may be evacuated to different barometric pressures (i.e., vacuum). Specifically, the first vacuum insulation module 10a is evacuated to a first barometric pressure, the second vacuum insulation module 10b is evacuated to a second barometric pressure, and wherein the third vacuum insulation module 10c is evacuated to a third barometric pressure. For example, the first and third vacuum insulation modules 10a, 10c may be evacuated to a barometric pressure of approximately 14.96 inches Hg, while the second vacuum insulation module 10b may be evacuated to a barometric pressure greater than the barometric pressure of the first and third vacuum insulation modules 10a, 10c. For example, the second vacuum insulation module 10b can be evacuated to a barometric pressure of approximately 29.92 inches Hg (i.e., total vacuum). Partial evacuation of the first and third vacuum insulation modules 10a, 10c to a lesser barometric pressure of the second vacuum insulation module 10b helps to reduce the stresses on the second vacuum insulation module 10b. In addition, the force exerted by the magnets 20 helps to maintain the structural integrity of the vacuum insulation assembly 100 may be reduced. It will be appreciated that the first and third vacuum insulation modules 10a, 10c can be evacuated to different barometric pressures, depending on the application of the vacuum insulation assembly 100.

As described above, a vacuum insulation module and assembly is capable of maintaining the structural integrity under a partial or total vacuum by preventing the layers of material to come into physical contact with one another, thereby minimizing or eliminating conductive heat transfer, sound transmission, and the like, through the vacuum insulation module and assembly.

The patents and publications referred to herein are hereby incorporated by reference.

Having described presently preferred embodiments the invention may be otherwise embodied within the scope of the appended claims.

What is claimed is:

1. A vacuum insulation assembly comprising a plurality of vacuum insulation modules arranged adjacent each other, each vacuum insulation module, comprising:
   a first layer of material having a perimeter edge;
   a second layer of material having a perimeter edge, the second layer of material spaced apart from the first layer of material;
   a frame member disposed between the perimeter edges of the first layer of material and the second layer of material;
   a vacuum chamber formed between the first layer of material and the second layer of material and the frame member;
   a first spacer associated with the first layer of material; and
   a second spacer associated with the second layer of material,
   wherein the first and second spacers generate a sufficient magnetic field to prevent physical contact between the first layer of material and the second layer of material,
   wherein the vacuum insulation assembly comprises at least two vacuum insulation modules,
   wherein the first vacuum insulation module is evacuated to a first barometric pressure, and
   wherein the second vacuum insulation module is evacuated to a second barometric pressure, the second barometric pressure different than the first barometric pressure.

2. The vacuum insulation assembly of claim 1, wherein the first and second spacers comprise a permanent magnet having a north pole and a south pole, and wherein one of the north pole and the south pole of each spacer is facing towards each other.

3. The vacuum insulation assembly of claim 2, wherein the first and second spacers are substantially aligned with each other.

4. The vacuum insulation assembly of claim 1, wherein the first and second spacers comprise an electromagnet.

5. The vacuum insulation assembly of claim 1, wherein the first and second spacers are positioned within the vacuum chamber, outside the vacuum chamber or disposed within the first and second layers of material.

6. The vacuum insulation assembly of claim 1, wherein the vacuum insulation assembly comprises a first vacuum insulation module, a second vacuum insulation module, and a third vacuum insulation module, the second vacuum insulation module disposed between the first and third vacuum insulation modules.

7. The vacuum insulation assembly of claim 6, wherein the first vacuum insulation module is evacuated to a first barometric pressure, wherein the second vacuum insulation module is evacuated to a second barometric pressure, and wherein the third vacuum insulation module is evacuated to a third barometric pressure.

8. The vacuum insulation assembly of claim 7, wherein the second barometric pressure is greater than the first and third barometric pressures.

9. The vacuum insulation assembly of claim 8, wherein the second barometric pressure is approximately 29.92 Hg inches.

10. The vacuum insulation assembly of claim 1, wherein the first barometric pressure is approximately one-half of the second barometric pressure.

11. The vacuum insulation assembly of claim 1, wherein the second layer of material of the first vacuum insulation module and the first layer of material of the second vacuum insulation module comprises only one layer of material.

12. A vacuum insulation assembly comprising a plurality of vacuum insulation modules arranged adjacent each other, each vacuum insulation module comprising:
- a first layer of material having a perimeter edge;
- a second layer of material having a perimeter edge, the second layer of material spaced apart from the first layer of material;
- a frame member disposed between the perimeter edges of the first layer of material and the second layer of material;
- a vacuum chamber formed between the first layer of material and the second layer of material and the frame member;
- a first spacer associated with the first layer of material; and
- a second spacer associated with the second layer of material, wherein the first and second spacers generate a sufficient magnetic field so as to prevent physical contact between the first layer of material and the second layer of material, wherein the vacuum insulation assembly comprises a first vacuum insulation module, a second vacuum insulation module, and a third vacuum insulation module, the second vacuum insulation module disposed between the first and third vacuum insulation modules, wherein the first vacuum insulation module is evacuated to a first barometric pressure, wherein the second vacuum insulation module is evacuated to a second barometric pressure, and wherein the third vacuum insulation module is evacuated to a third barometric pressure, and wherein the second barometric pressure is greater than the first and third barometric pressures.

13. The vacuum insulation assembly of claim 12, wherein the first and second spacers comprise a permanent magnet having a north pole and a south pole, and wherein one of the north pole and the south pole of each spacer is facing towards each other.

14. The vacuum insulation assembly of claim 13, wherein the first and second spacers are substantially aligned with each other.

15. The vacuum insulation assembly of claim 12, wherein the first and second spacers comprise an electromagnet.

16. The vacuum insulation assembly of claim 12, wherein the first and second spacers are positioned within the vacuum chamber, outside the vacuum chamber or disposed within the first and second spacers.

17. The vacuum insulation assembly of claim 12, wherein the second barometric pressure is approximately 29.92 Hg inches.

18. The vacuum insulation assembly of claim 12, wherein the first barometric pressure and the third barometric pressure is approximately one-half of the second barometric pressure.

19. The vacuum insulation assembly of claim 12, wherein the second layer of material of the first vacuum insulation module and the first layer of material of the second vacuum insulation module comprises only one layer of material.

20. The vacuum insulation assembly of claim 19, wherein the second layer of material of the second vacuum insulation module and the first layer of material of the third vacuum insulation module comprises only one layer of material.

* * * * *